US006831663B2

(12) United States Patent
Chickering et al.

(10) Patent No.: US 6,831,663 B2
(45) Date of Patent: Dec. 14, 2004

(54) SYSTEM AND PROCESS FOR AUTOMATICALLY EXPLAINING PROBABILISTIC PREDICTIONS

(75) Inventors: David Maxwell Chickering, Bellevue, WA (US); David E. Heckerman, Bellevue, WA (US); Robert Rounthwaite, Fall City, WA (US)

(73) Assignee: Microsoft Corporation, Redmond, WA (US)

( * ) Notice: Subject to any disclaimer, the term of this patent is extended or adjusted under 35 U.S.C. 154(b) by 507 days.

(21) Appl. No.: 09/681,709

(22) Filed: May 24, 2001

(65) Prior Publication Data

US 2002/0180805 A1 Dec. 5, 2002

(51) Int. Cl.[7] .................................................. G09G 5/00
(52) U.S. Cl. ...................... 345/700; 395/50; 395/52; 395/63; 395/64; 705/1; 705/5; 705/10; 705/14; 705/26; 705/27; 707/2; 707/3; 707/4; 707/102; 707/107.1
(58) Field of Search ............................. 349/700; 395/50, 395/52, 63, 64; 705/1, 5, 10, 14, 26, 27; 707/2, 3, 4, 102, 104.1

(56) References Cited

U.S. PATENT DOCUMENTS 5,418,888 A * 5/1995 Alden .......................... 706/48
5,749,081 A * 5/1998 Whiteis ....................... 707/102
6,266,649 B1 * 7/2001 Linden et al. ................. 705/26
6,662,177 B1 * 12/2003 Martino et al. ................ 707/3

OTHER PUBLICATIONS

Merriam–Webster's Collegiate Dictionary, Tenth Edition. Springfield, Massachusetts: 2001. p. 907, left col.*

* cited by examiner

*Primary Examiner*—Kristine Kincaid
*Assistant Examiner*—Boris Pesin
(74) *Attorney, Agent, or Firm*—Lyon & Harr, LLP; Mark A. Watson

(57) ABSTRACT

The system and method of the present invention automatically assigns "scores" to the predictor/variable value pairs of a conventional probabilistic model to measure the relative impact or influence of particular elements of a set of topics, items, products, etc. in making specific predictions using the probabilistic model. In particular, these scores measure the relative impact, either positive or negative, that the value of each individual predictor variable has on the posterior distribution of the target topic, item, product, etc., for which a probability is being determined. These scores are useful for understanding why each prediction is make, and how much impact each predictor has on the prediction. Consequently, such scores are useful for explaining why a particular prediction or recommendation was made.

20 Claims, 3 Drawing Sheets

SYSTEM AND PROCESS FOR AUTOMATICALLY EXPLAINING PROBABILISTIC PREDICTIONS

BACKGROUND OF INVENTION

1. Technical Field

The present invention involves a new system and process for automatically assigning scores to predictor values for measuring the influence of each predictor/variable value pair on a prediction of likely user choices.

2. Related Art

By way of background, collaborative filtering or recommender systems typically use various probabilistic methods in combination with one or more databases comprised of user preferences to predict additional topics, items, or products a new user might like. Generally, the goal of such systems is to predict the utility of items to a particular user based on a database of user preferences or votes from a sample or population of other users. Either of two general classes of collaborative filtering algorithms, e.g., memory-based algorithms or model-based collaborative filtering, is often used for making such predictions. One limitation of such systems is that while they are useful for predicting user preferences, they are not useful for determining the contribution or influence of particular user preferences or votes from the population of users on particular user preference predictions.

For example, a probabilistic model can be used for making predictions in a movie-recommendation application that suggests movies to users based on the other movies that they have seen. One method of implementing such a system is to build a probabilistic model over the set of variables $M=\{M_1, \ldots, M_n\}$, where $M_i$ is a binary variable denoting whether or not a user has seen the ith movie. The model is constructed such that, for each movie i, the conditional probability, $p(M_i=\text{watched} |M\backslash\{M_i\})$ is extracted for each movie. In general, such a system is used to recommend movies as follows: for each movie $M_i$ that a user has not watched, the probability that the user would have watched the movie is calculated based on the assumption that it is unknown whether the user has actually watched movie $M_i$. Such a system then recommends those movies that have the highest posterior probability. However, while this system recommends movies based on the probability that a user will want to watch the movies, it fails to answer the question as to why the user might want to watch the movies. In other words, such a system is unable to determine which other movies from the set $M=\{M_1, \ldots, M_n\}$ were most influential in making the particular probabilistic recommendations to the user.

Consequently, what is needed is a system and process for determining which elements of a probabilistic model have the greatest influence on particular probabilistic predictions or recommendations computed from the probabilistic model. Determining which elements have the greatest influence on the predictions or recommendations allows the question to be answered as to why such predictions or recommendations were made.

SUMMARY OF INVENTION

In general, the present invention solves the aforementioned problems, as well as other problems that will become apparent from an understanding of the following description by automatically assigning "scores" to the predictor/variable value pairs of a conventional probabilistic model to measure the relative impact or influence of particular elements of a set of topics, items, products, etc. on particular predictions. In particular, these scores measure the relative impact, either positive or negative, that the value of each individual predictor variable has on the posterior distribution of the target topic, item, product, etc., for which a probability is being determined. These scores are useful for understanding why each prediction is made, and how much impact each predictor has on the prediction. Consequently, such scores are useful for explaining why a particular recommendation was made.

For example, where a probabilistic model recommends particular movies to a user based upon other movies that the user has seen, an application embodying the present invention provides information as to what other movies were most influential in making the particular recommendations. Thus, for example, where the predictor/variable value pairs associated with watching movie j, and with not watching movie k, have the highest scores, these predictor/variable value pairs are provided as the most influential factors in determining whether the user should be provided with a recommendation to watch movie i. In one embodiment, such information is provided as a human-readable or "natural language" explanation such as, for example, "Movie i was recommended to the user because the user watched movie j, but did not watch movie k." Further, any number of the top most influential topics, items, products, etc., may be provided for the purpose of explaining particular recommendations. In other words, the top n most influential predictor/variable value pairs can be provided for the purpose of explaining particular probabilistic recommendations. Clearly, the most positive influences as well as the most negative influences may be identified.

In accordance with preceding discussion, a system and method according to the present invention operates to automatically assign scores to members of a set of at least one predictor/variable value pair representing likely user choices for determining the effect or influence of those predictor/variable value pairs on predictions of one or more likely user choices. This is accomplished by first obtaining a set of user preferences for a particular user. These preferences are obtained either explicitly or implicitly using conventional techniques.

For example, one common method for explicitly obtaining user preferences involves asking a user to rate particular objects, such as topics, items, products, books, movies, food, drinks, etc., on some predefined schedule or list. One example of implicitly obtaining user preferences is to simply identify whether a user has used, purchased, viewed, etc., such objects. Further, another common method for implicitly obtaining user preferences involves observing user behavior in order to impute particular preferences to that user. For example, the idea here is that by watching a particular movie, the user is showing a preference for that movie over the movies that the user didn't watch. Examples of such observation include observing a user's Internet web browsing behavior, i.e., what items or objects does the user look at while browsing; observing a user's purchasing history to see what the user buys, when the user buys, and where the user buys; and observing other available informational patterns. Clearly, any conventional technique for either implicitly or explicitly determining user preferences, or some combination of both implicit and explicit determination of user preferences, may be used to determine a set of user preferences.

Next, once the user preferences have been determined using conventional techniques, the probability of each variable/variable value pair is computed, again using conventional techniques using the set of user preferences in combination with a probabilistic model. Simple examples of variable/variable value pairs include "Movie 1/watched," or "Book 5/not read." The probabilistic model can be any conventional type, including, for example, dependency networks and Bayesian networks, so long as the probabilistic model can be used to compute the probability of variable/variable value pairs. Next, at least one prediction of likely user choices is automatically computed based upon the variable/variable value pairs using conventional techniques.

To differentiate the variable/variable value pairs from the predictions of likely user choices, the term "predictor/variable value pair" is used in place of "variable/variable value pair" to refer to a variable that is used in the probabilistic model to predict the specific target for which a prediction is being made. Further, it should be noted that the set of all predictor/variable value pairs that are evaluated is preferably restricted by those pairs that are observed or implied for a particular user. For example, if it is known that a user has watched Movie 5, no evaluation is made of the effect on a given prediction of the user not watching Movie 5.

The system and method of the present invention then calculates "explanation scores" for at least one of the predictor/variable value pairs for each prediction. These scores are then used for determining the influence of specific predictor/variable value pairs for each prediction based upon the scores calculated for specific predictor/variable value pairs. In a further embodiment, explanation scores are evaluated for either all predictor/variable value pairs, or most generally, for arbitrary sets of predictor/variable value pairs of size n.

This embodiment is useful for explaining when or why particular sets of predictor/variable value pairs had a greater influence than either individual predictor/variable value pairs, or than other sets of predictor/variable value pairs having lesser, equal or greater numbers of predictor/variable value pairs.

Specifically, as described above, the present invention provides a system and method for assigning an explanation score to an observed value of a predictor variable when predicting a state of a target variable. This explanation score is then used to choose the predictor/variable value pairs, or sets of predictor/variable value pairs, that individually had the greatest influence, either positive or negative, on the posterior probability of the given (i.e. recommended) state of the target variable. These predictor/variable value pairs are then presented, in one embodiment, as a simple list, or alternatively, as a natural language "explanation" similar to the example provided above describing why Movie i was recommended to the user. Further, in a related embodiment, the least influential predictor/variable value pairs are determined by identifying those predictor/variable value pairs having the lowest explanation scores. This embodiment is useful for determining which predictor/variable value pairs, or sets of predictor/variable value pairs, individually had the least influence, either on the posterior probability of the given state of the target variable.

In addition to the just described benefits, other advantages of the present invention will become apparent from the detailed description which follows hereinafter when taken in conjunction with the accompanying drawing figures.

BRIEF DESCRIPTION OF DRAWINGS

The specific features, aspects, and advantages of the present invention will become better understood with regard to the following description, appended claims, and accompanying drawings where:

DETAILED DESCRIPTION

In the following description of the preferred embodiments of the present invention, reference is made to the accompanying drawings, which form a part hereof, and in which is shown by way of illustration specific embodiments in which the invention may be practiced. It is understood that other embodiments may be utilized and structural changes may be made without departing from the scope of the present invention.

Figure 1:
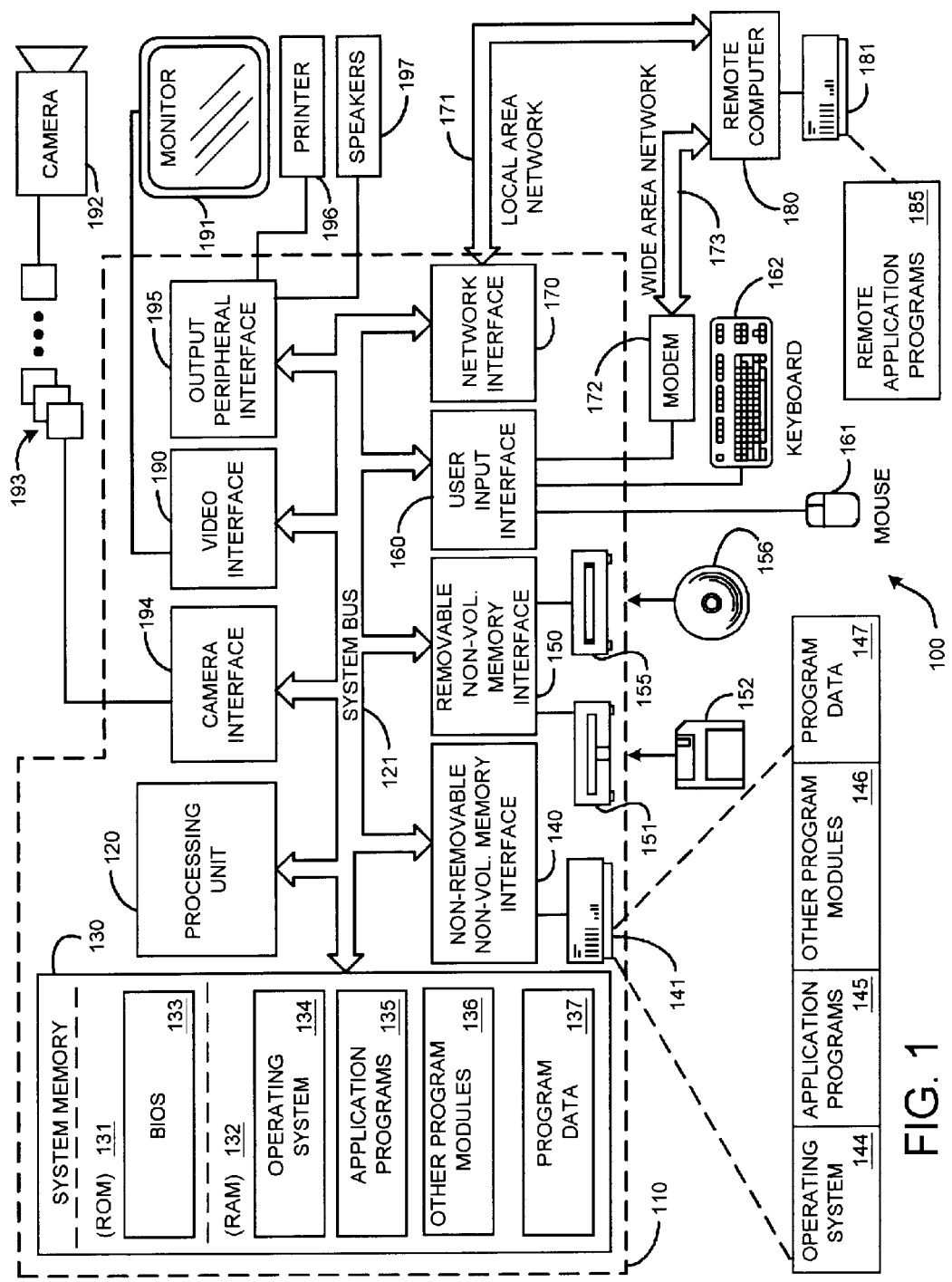
FIG. 1 is a diagram depicting a general-purpose computing device constituting an exemplary system for implementing the present invention.

Exemplary Operating Environment:

FIG. 1 illustrates an example of a suitable computing system environment 100 on which the invention may be implemented. The computing system environment 100 is only one example of a suitable computing environment and is not intended to suggest any limitation as to the scope of use or functionality of the invention. Neither should the computing environment 100 be interpreted as having any dependency or requirement relating to any one or combination of components illustrated in the exemplary operating environment 100.

The invention is operational with numerous other general purpose or special purpose computing system environments or configurations. Examples of well known computing systems, environments, and/or configurations that may be suitable for use with the invention include, but are not limited to, personal computers, server computers, hand-held, laptop or mobile computer or communications devices such as cell phones and PDA's, multiprocessor systems, microprocessor-based systems, set top boxes, programmable consumer electronics, network PCs, minicomputers, mainframe computers, distributed computing environments that include any of the above systems or devices, and the like.

The invention may be described in the general context of computer-executable instructions, such as program modules, being executed by a computer. Generally, program modules include routines, programs, objects, components, data structures, etc. that perform particular tasks or implement particular abstract data types. The invention may also be practiced in distributed computing environments where tasks are performed by remote processing devices that are linked through a communications network. In a distributed computing environment, program modules may be located in both local and remote computer storage media including memory storage devices. With reference to FIG. 1, an exemplary system for implementing the invention includes a general purpose computing device in the form of a computer 110.

Components of computer 110 may include, but are not limited to, a processing unit 120, a system memory 130, and a system bus 121 that couples various system components including the system memory to the processing unit 120. The system bus 121 may be any of several types of bus structures including a memory bus or memory controller, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus also known as Mezzanine bus.

Computer 110 typically includes a variety of computer readable media. Computer readable media can be any available media that can be accessed by computer 110 and includes both volatile and nonvolatile media, removable and non-removable media. By way of example, and not limitation, computer readable media may comprise computer storage media and communication media. Computer storage media includes both volatile and nonvolatile, removable and non-removable media implemented in any method or technology for storage of information such as computer readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can be accessed by computer 110. Communication media typically embodies computer readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of the any of the above should also be included within the scope of computer readable media.

The system memory 130 includes computer storage media in the form of volatile and/or nonvolatile memory such as read only memory (ROM) 131 and random access memory (RAM) 132. A basic input/output system 133 (BIOS), containing the basic routines that help to transfer information between elements within computer 110, such as during start-up, is typically stored in ROM 131. RAM 132 typically contains data and/or program modules that are immediately accessible to and/or presently being operated on by processing unit 120. By way of example, and not limitation, FIG. 1 illustrates operating system 134, application programs 135, other program modules 136, and program data 137.

The computer 110 may also include other removable/non-removable, volatile/nonvolatile computer storage media. By way of example only, FIG. 1 illustrates a hard disk drive 141 that reads from or writes to non-removable, nonvolatile magnetic media, a magnetic disk drive 151 that reads from or writes to a removable, nonvolatile magnetic disk 152, and an optical disk drive 155 that reads from or writes to a removable, nonvolatile optical disk 156 such as a CD ROM or other optical media. Other removable/non-removable, volatile/nonvolatile computer storage media that can be used in the exemplary operating environment include, but are not limited to, magnetic tape cassettes, flash memory cards, digital versatile disks, digital video tape, solid state RAM, solid state ROM, and the like. The hard disk drive 141 is typically connected to the system bus 121 through a non-removable memory interface such as interface 140, and magnetic disk drive 151 and optical disk drive 155 are typically connected to the system bus 121 by a removable memory interface, such as interface 150.

The drives and their associated computer storage media discussed above and illustrated in FIG. 1, provide storage of computer readable instructions, data structures, program modules and other data for the computer 110. In FIG. 1, for example, hard disk drive 141 is illustrated as storing operating system 144, application programs 145, other program modules 146, and program data 147. Note that these components can either be the same as or different from operating system 134, application programs 135, other program modules 136, and program data 137. Operating system 144, application programs 145, other program modules 146, and program data 147 are given different numbers here to illustrate that, at a minimum, they are different copies. A user may enter commands and information into the computer 110 through input devices such as a keyboard 162 and pointing device 161, commonly referred to as a mouse, trackball or touch pad. Other input devices (not shown) may include a microphone, joystick, game pad, satellite dish, scanner, or the like. These and other input devices are often connected to the processing unit 120 through a user input interface 160 that is coupled to the system bus 121, but may be connected by other interface and bus structures, such as a parallel port, game port or a universal serial bus (USB). A monitor 191 or other type of display device is also connected to the system bus 121 via an interface, such as a video interface 190. In addition to the monitor, computers may also include other peripheral output devices such as speakers 197 and printer 196, which may be connected through an output peripheral interface 195.

Further, the computer 110 may also include, as an input device, a camera 192 (such as a digital/electronic still or video camera, or film/photographic scanner) capable of capturing a sequence of images 193. Further, while just one camera 192 is depicted, multiple cameras could be included as input devices to the computer 110. The use of multiple cameras provides the capability to capture multiple views of an image simultaneously or sequentially, to capture three-dimensional or depth images, or to capture panoramic images of a scene. The images 193 from the one or more cameras 192 are input into the computer 110 via an appropriate camera interface 194. This interface is connected to the system bus 121, thereby allowing the images 193 to be routed to and stored in the RAM 132, or any of the other aforementioned data storage devices associated with the computer 110. However, it is noted that image data can be input into the computer 110 from any of the aforementioned computer-readable media as well, without requiring the use of a camera 192.

The computer 110 may operate in a networked environment using logical connections to one or more remote computers, such as a remote computer 180. The remote computer 180 may be a personal computer, a server, a router, a network PC, a peer device or other common network node, and typically includes many or all of the elements described above relative to the computer 110, although only a memory storage device 181 has been illustrated in FIG. 1. The logical connections depicted in FIG. 1 include a local area network (LAN) 171 and a wide area network (WAN) 173, but may also include other networks. Such networking environments are commonplace in offices, enterprise-wide computer networks, intranets and the Internet.

When used in a LAN networking environment, the computer 110 is connected to the LAN 171 through a network interface or adapter 170. When used in a WAN networking environment, the computer 110 typically includes a modem 172 or other means for establishing communications over the WAN 173, such as the Internet. The modem 172, which may be internal or external, may be connected to the system bus 121 via the user input interface 160, or other appropriate mechanism. In a networked environment, program modules depicted relative to the computer 110, or portions thereof, may be stored in the remote memory storage device. By way of example, and not limitation, FIG. 1 illustrates remote application programs 185 as residing on memory device 181. It will be appreciated that the network connections shown are exemplary and other means of establishing a communications link between the computers may be used.

The exemplary operating environment having now been discussed, the remaining part of this description will be devoted to a discussion of the program modules and process embodying the present invention. The program modules associated with measuring the influence of predictor/variable value pairs on a prediction of likely user choices will be described first in reference to the system diagram of FIG. 2. Then, the processes for measuring the influence of predictor/variable value pairs on a prediction of likely user choices will be described with reference to the flow diagram of FIG. 3.

Figure 2:
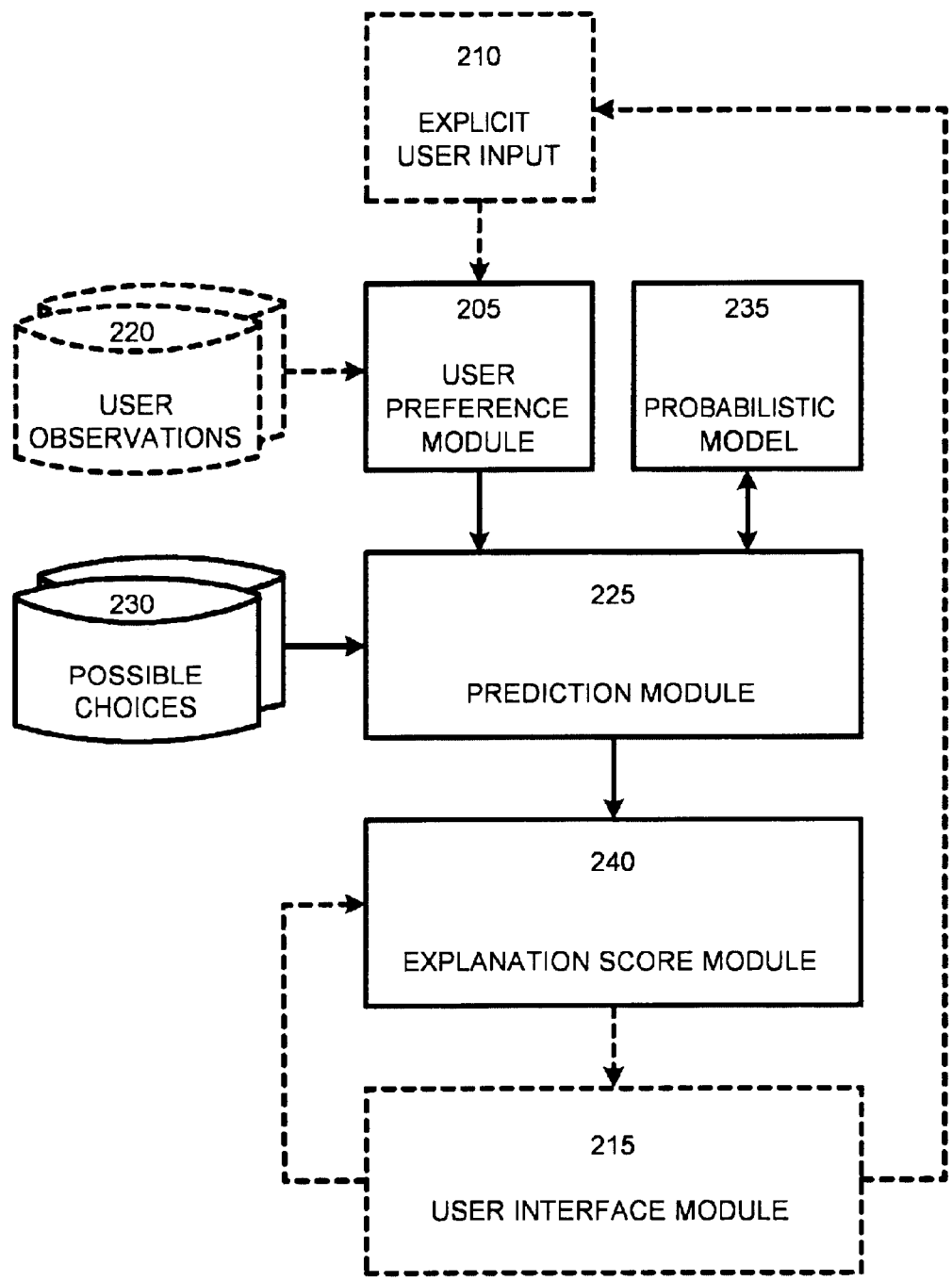
FIG. 2 is a system diagram that depicts program modules employed in a system for measuring the influence of predictor/variable value pairs on a prediction of likely user choices in accordance with the present invention.

System Overview:

FIG. 2 is a general system diagram illustrating program modules used for measuring the influence of predictor/variable value pairs on a prediction of likely user choices. It should be noted that the boxes and interconnections between boxes that are represented by broken or dashed lines in FIG. 2 represent alternate embodiments of the present invention, and that any or all of these alternate embodiments, as described throughout this document, may be used in combination.

In general, a system and method according to the present invention uses the program modules illustrated in FIG. 2 for measuring the influence of predictor/variable value pair on a prediction of likely user choices. This influence is measured by automatically assigning "scores" to the predictor/variable value pairs of a conventional probabilistic model to measure the relative impact or influence of particular elements of a set of topics, items, products, etc. In particular, these scores measure the relative impact, either positive or negative, that the value of each individual predictor variable has on the posterior distribution of the target topic, item, product, etc., for which a probability is being determined. These scores are useful for understanding why each prediction is made, and how much impact each predictor has on the prediction. Consequently, such scores are useful for explaining why a particular recommendation was made.

For example, where a probabilistic model recommends particular movies to a user based upon other movies that the user has seen, an application embodying the present invention would further provide information as to what other movies were most influential in making the particular recommendations. Thus, for example, where the predictor/variable value pairs associated with watching movie j, and with not watching movie k, have the highest scores, these predictor/variable value pairs are provided as the most influential factors in determining whether the user should be provided with a recommendation to watch movie i. In one embodiment, such information is provided as a human-readable explanation such as, for example, "Movie i was recommended to the user because the user watched movie j, but did not watch movie k." Further, any number of the top most influential topics, items, products, etc., may be provided for the purpose of explaining particular recommendations. In other words, the top n most influential predictor/variable value pairs can be provided for the purpose of explaining particular probabilistic recommendations. Clearly, the most positive influences as well as the most negative influences may be identified.

In accordance with preceding discussion, a system and method according to the present invention operates to automatically assign scores to members of a set of at least one predictor/variable value pair representing likely user choices for determining the effect or influence of those predictor/variable value pairs on predictions of one or more likely user choices. In accordance with FIG. 2, this is accomplished by first obtaining a set of user preferences for a particular user via a user interface module 205. These preferences are obtained either explicitly or implicitly using conventional techniques.

For example, one common method for explicitly obtaining user preferences involves asking a user to rate particular objects, such as topics, items, products, books, movies, food, drinks, etc., on some predefined schedule or list. Such explicit user input 210 is provided via a user interface module 215 that uses conventional techniques for entering user preference data or information. One example of implicitly obtaining user preferences is to simply identify whether a user has used, purchased, viewed, etc., such objects. In addition, another common method for implicitly obtaining user preferences involves using a set of user observations 220 to predict user preferences via a prediction module 225 using conventional techniques. In particular, user behavior is observed in order to impute particular preferences to that user. For example, the idea here is that by watching a particular movie, a user is showing a preference for that movie over other movies that the user did not watch. Examples of such observation include observing a user's Internet web browsing behavior, i.e., what items or objects does the user look at while browsing; observing a user's purchasing history to see what the user buys, when the user buys, and where the user buys; and observing other available informational patterns. Clearly, any conventional technique for either implicitly or explicitly determining user preferences, or some combination of both implicit and explicit determination of user preferences, may be used to determine a set of user preferences for use by the user preference module 205.

Next, once the user preferences have been determined using conventional techniques, variable/variable value pairs are computed by the prediction module 225, again using conventional techniques, for each possible user choice 230 using the set of user preferences in combination with a probabilistic model 235. The probabilistic model 235 can be any conventional type of probabilistic distribution or machine learning technique, including, for example, dependency networks with decision trees as the local distributions, so long as the probabilistic model can be used to compute the probability of variable/variable value pairs for all variables for which there is an interest in making a recommendation. Again, at least one prediction of likely user choices is automatically computed by the prediction module 225 based upon the probability of variable/variable value pairs. For example, where the prediction module identifies the movie $i(M_i)$ for which $p(M_i=\text{watched}|\text{other preferences})$ is as having the highest probability, $M_i$ is output as the recommendation.

To differentiate the variable/variable value pairs described above from the predictions of likely user choices, the term "predictor/variable value pair" is used in place of "variable/ variable value pair" to refer to a variable that is used in the probabilistic model to predict the specific target for which a prediction is being made. Further, it should be noted that the set of all predictor/variable value pairs that are evaluated is preferably restricted by those pairs that are observed or implied for a particular user. For example, if it is known that a user has watched Movie 5, no evaluation is made of the effect on a given prediction of the user not watching Movie 5.

The system and method of the present invention then calculates "explanation scores" using an explanation score module 240 for at least one of the predictor/variable value pairs for each prediction. These scores are then used for determining the influence of specific predictor/variable value pairs for each prediction based upon the scores calculated for specific predictor/variable value pairs. In a further embodiment, explanation scores are evaluated for either all predictor/variable value pairs, or most generally, for arbitrary sets of predictor/variable pairs of size n. At least one of the explanation scores for each prediction is provided via the user interface module 215. In addition, in further embodiments, minimum or maximum thresholds for reporting explanation scores are set via the user interface module 215. Similarly, in still further embodiments, a total number of the most or least significant explanation scores, or some combination thereof, is also provided via the user interface module 215.

Figure 3:
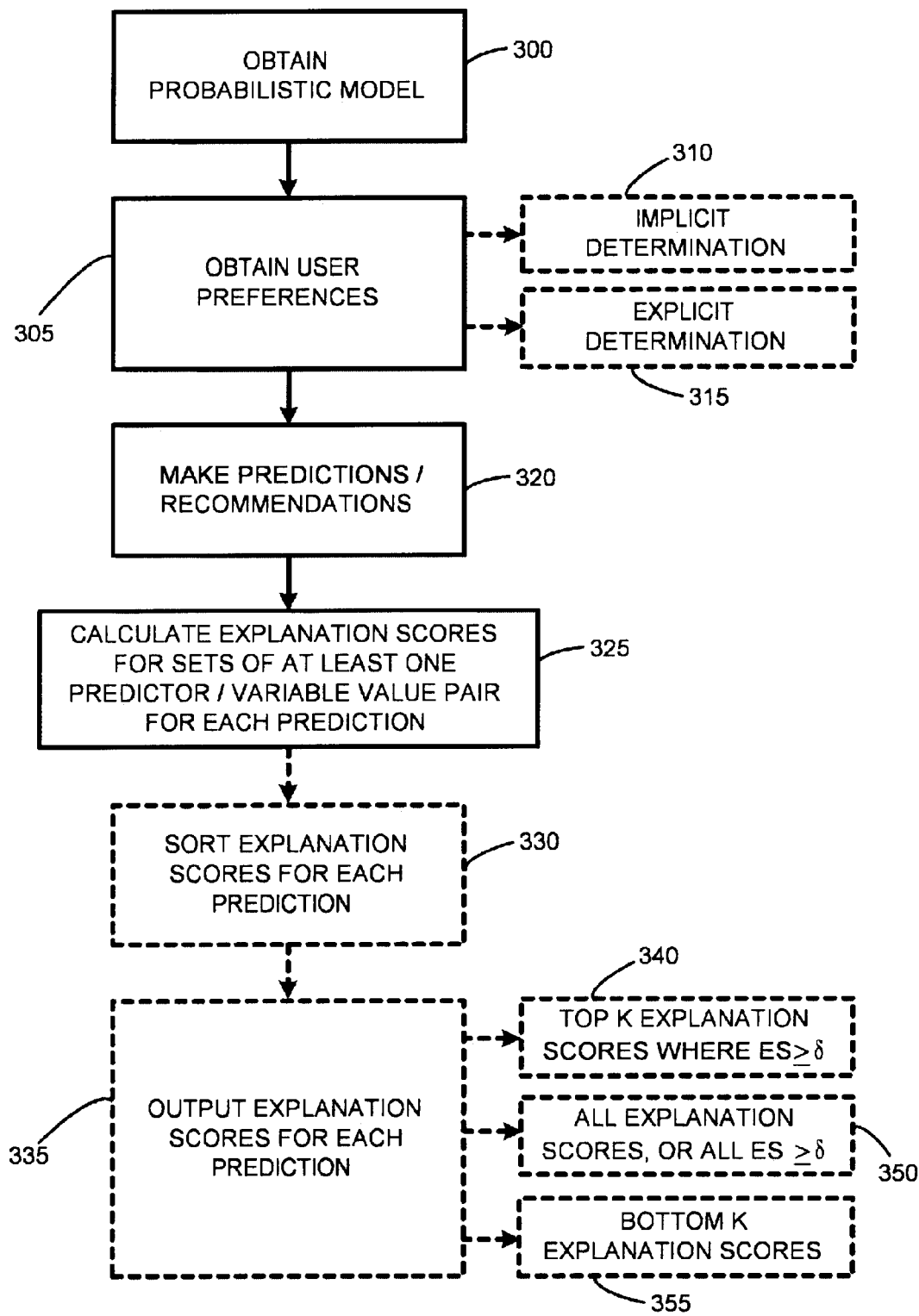
FIG. 3 is a flow diagram illustrating an exemplary process for implementing the program modules of FIG. 2 according to the present invention.

Operation:

The above-described program modules are employed to automatically determine the influence of predictor/variable value pair on a prediction of likely user choices using the exemplary process that will now be described. This process is depicted in the flow diagram of FIG. 3 as a series of actions that illustrates an exemplary method for implementing the present invention. It should be noted that the boxes and interconnections between boxes that are represented by broken or dashed lines in FIG. 3 represent alternate embodiments of the present invention, and that any or all of these alternate embodiments, as described throughout this document, may be used in combination.

Specifically, as described above, the present invention provides a system and method for assigning an explanation score to an observed value of a predictor variable when predicting a state of a target variable. This explanation score is then used to choose the predictor variable/value pairs that individually had the greatest influence, either positive or negative, on the posterior probability of the given (i.e. recommended) state of the target variable. These predictor variable/values are then presented, in one embodiment, as a simple list, or alternatively, as a natural language "explanation." Similar to the example provided above describing why Movie i was recommended to the user.

In general, the system and process of the present invention is started by obtaining a probabilistic model 300, such as by learning or creating one using conventional machine learning techniques, or by otherwise manually or automatically creating the probabilistic model using conventional techniques. Similarly, existing probabilistic models, however created or obtained are also usable by the system and process of the present invention. Next, a set of user preferences are obtained 305, either implicitly 310, or explicitly 315, as described above. Next predictions or recommendations are made 320 using both the probabilistic model, and the user preferences. Once the predictions or recommendations have been made 320, explanation scores are automatically calculated for sets of at least one predictor/variable value pair for each prediction 325.

The following notation is useful for describing the computation and assigning of scores as described herein. In particular, let $X=\{X_1, \ldots, X_m\}$ denote the set of variables in a domain of interest (e.g. one variable for each movie that a person might watch). Let $T \in X$ denote a target variable (e.g., a particular movie), and let t denote a given domain of that target variable (e.g. watched, or not watched). It should be appreciated by those skilled in the art that the domain of the target variable does not need to be binary, as in "watched" or "not watched." For example, the domain of the target variable may be real numbers or positive integers.

When making a prediction for variable T, the known values for all of the other variables in the domain can be used. Specifically, from the given example, the known "watched" or "not watched" value for all the movies except for the one that is being predicted is used. This set is denoted by $C=X\setminus\{T\}$ (i.e., C is the set of all movies having a known "watched" or "not watched" value with the exception of the movie for which a prediction is being made). Further, c is used to denote the known values, i.e., $x_i$, for all of the elements of C.

A conventional probabilistic model is then used to compute $p(T=t|C=c)$. In other words, the probabilistic model is used to compute the probability that movie T has been watched given that it is known whether the rest of the movies of set C have been watched. The explanation score is defined for each variable $X_i \in C$, and reflects the impact that the observed value $x_i$ has on the above distribution. In particular, where $C(i)$ and $c(i)$ denote $C\setminus X_i$ and $c|x_i$ respectively, then the explanation score (ES) for the observation $X_i=x_i$ on the prediction of $T=t$ is given by Equation 1 as follows:

$$ES_{T=t}(X_i, x_i) = \log\left[\left(\frac{p(T=t|C=c)}{1-p(T=t|C=c)}\right) \middle/ \left(\frac{p(T=t|C(i)=c(i))}{1-p(T=t|C(i)=c(i))}\right)\right] \quad \text{Eqn. 1}$$

The numerator of Equation 1 represents the posterior odds for T=t when all variables in C are observed. Further, the denominator of Equation 1 represents the posterior odds for T=t when the value $X_i=x_i$ is not known, but all other variables in C are observed. Large positive values of ES indicate that the observation $X_i=x_i$ increases the posterior odds of T=t by a large amount. Large negative values of ES imply that the observation decreases the posterior odds by a large amount. Values of ES close to zero indicate that the observation has little effect on the posterior odds.

It should be noted that the taking the log of the product of the numerator and denominator in Equation 1 is not necessary. The log term is used for convenience only. Specifically, if the log term is removed from Equation 1, then the results of Equation 1 can best be described as follows: Values of ES greater than 1 indicate that the observation $X_i=x_i$ increases the posterior odds of T=t. Values of ES less than 1 imply that the observation decreases the posterior odds of T=t. And finally, values of ES close to 1 indicate that the observation has little effect on the posterior odds.

In general, the numerator can be computed efficiently using the probabilistic model with the model that was constructed to compute $p(T=t|C=c)$ in order to make recommendations. The term $p(T=t|C(i)=c(i))$ from the denominator can be obtained via inference from any conventional probabilistic model that encodes a joint distribution over the variables X. Examples of such models and various methods for performing inference given a known joint distribution are well known to those skilled in the art, and include the use of Bayes Rule.

Further, for purposes of clarity, Equation 1 can be rewritten as Equation 2 as follows without using the summary notation $C=X\setminus\{T\}$, and of $C(i)$ and $c(i)$ to denote $C\setminus X_i$ and $c|x_i$ respectively.

$$ES_{T=i}(X_i, x_i) = \log\left[\frac{\left(\frac{p(T=t \mid X_i = x_i \ldots X_n = x_n)}{1-p(T=t \mid X_i = x_i \ldots X_n = x_n)}\right)}{\left(\frac{p(T=t \mid X_i = x_i \ldots X_{i-1} = x_{i-1}, X_{i+1} = x_{i+1} \ldots X_n = x_n)}{1-p(T=t \mid X_i = x_i, \ldots X_{i-1} = x_{i-1}, X_{i+1} = x_{i+1} \ldots X_n = x_n)}\right)}\right] \quad \text{Eqn. 2}$$

Thus, from equation 2, and in accordance with the preceding discussions, it is clear that the numerator of Equation 2 is the ratio between the probability that T is equal to t for all $x_i$, and the probability that T is not equal to t for all $x_i$. Further, it is also clear form Equation 2 that the denominator is the ratio between the probability that T is equal to t with respect to all x with the exception of the target variable $x_i$, and the probability that T is not equal to t with respect to all x with the exception of the target variable $x_i$.

As described above, the terms in the denominator can be approximated using any of a number of conventional techniques, such as for example, applying the rules of probability to the joint distribution over all variables. For example, given a joint distribution, a conditional distribution in the denominator can be efficiently inferred using conventional rules of probability as described by Judea Pearl in "Probabilistic Reasoning in Intelligent Systems: Networks of Plausible Inference," Morgan Kaufmann Publishers, Inc., 1988. However, in an alternate embodiment, a unique solution has been implemented for approximating the denominator when using a dependency network that does not necessarily encode a joint distribution. For example, assuming that the dependency network contains a decision tree for the predictor $X_i$, then the approximation illustrated by Equation 3 may be used.

$$p(T=t|C(i)=c(i)) \sim \int p(T=t|C(i)=c(i), X_i=x_i) p(X_i=x_i|C(i)=c(i), T=t^*) \quad \text{Eqn. 3}$$

The integral of Equation 3 denotes a generalized summation operator that is instead a discrete sum if $X_i$ is discrete (i.e., 0 or 1, as in watched or didn't watch for a particular movie) rather than continuous. Further, t* denotes a default off state for variable T. For example, in the movie example provided above, the default off state corresponds to not watching the movie. In general, t* can denote any state of T, but using the most popular (e.g. most likely given no evidence) typically works well in practice.

Once the explanation scores have been calculated 325, in one embodiment, the scores are sorted 330, from either highest to lowest, or lowest to highest. These explanation scores are then output 335 via the user interface. Again, as described above, the explanation scores are output 335 either as raw scores, or in the context of a natural language explanation. In one embodiment, only the top k explanation scores, i.e., those scores having the greatest influence, greater than some predefined threshold, delta, are output 340. In a tested embodiment using log space, i.e., using the "log" term in Equations 1 and 2, a threshold value of 0.5 was found to work well for returning those scores having the greatest influence. It should be noted that when in log space, i.e., using the "log" term in Equations 1 and 2, both positive and negative numbers can be returned as explanation scores, with positive numbers corresponding to increases in log probabilities, and negative numbers corresponding to decreases in log probabilities.

In another embodiment, all explanation scores, or all explanation scores greater than or equal to a predefined threshold, delta, are output 350. Additionally, it should be noted that when in log space, setting the threshold to negative infinity allows for any explanation score to be returned. However, when not in log space, i.e., when not using the "log" term in Equations 1 and 2, setting the threshold to zero allows for any explanation score to be returned. Finally, in still another embodiment, where it is desired to determine and output the least significant predictor/variable value pairs, the bottommost k explanation scores are output 355.

Further, in another embodiment, the system and method described above with respect to Equations 1 through 3, is generalized to handle sets of predictor/variable value pairs. In general, an explanation score analogous to that provided by Equation 1 is used to evaluate the influence of a set of predictor/value pairs on the prediction. In particular, this explanation score consists of a ratio of posterior odds: the numerator contains the posterior odds for T=t when all variables in C are observed, and the denominator contains the posterior odds where the predictor/value pairs from the set of predictor/value pairs being scored are omitted from the conditioning set. As in the single predictor/value pair case described above for Equation 1, the terms in the denominator are computed in one embodiment via inference from a joint distribution using conventional probabilistic techniques as described above. In an alternate embodiment, approximations of the terms in the denominator are made in the manner described above with respect to Equation 3.

Working Example: A simple working example, as follows, serves to illustrate a system and process according to the present invention. Specifically, given a conventional probabilistic model for recommending one of four books, and given that a user has read the fourth book, but not the first, second or third book, the probabilities that a user might choose any of the first three books can be described by Equations 4, 5 and 6 as follows, where a 0 indicates that the book has not been read, and a 1 indicates that the book has been read:

$$p(\text{Book}_1=1|\text{Book}_2=0, \text{Book}_3=0, \text{Book}_4=1) \quad \text{Eqn. 4}$$

$$p(\text{Book}_2=1|\text{Book}_1=0, \text{Book}_3=0, \text{Book}_4=1) \quad \text{Eqn. 5}$$

$$p(\text{Book}_3=1|\text{Book}_1=0, \text{Book}_2=0, \text{Book}_4=1) \quad \text{Eqn. 6}$$

Further, once these probabilities have been determined, it is a simple matter to choose the book having the highest probability and recommend that book to the user. However, the next step, in accordance with the present invention is to explain why the particular book was recommended to the user.

Specifically, given Equations 4, 5, and 6, in view of Equations 1 and 2, to determine which book, i.e., $\text{Book}_2$, $\text{Book}_3$, or $\text{Book}_4$, had the greatest influence on a probabilistic recommendation for $\text{Book}_1$ is computed using equations 7, 8, and 9, respectively, as follows:

$$ES_{Book1-I}(Book_2, 0) = \log\left[\frac{\left(\frac{p(Book_1 = 1 \mid Book_2 = 0, Book_3 = 0, Book_4 = 1)}{1 - p(Book_1 = 1 \mid Book_2 = 0, Book_3 = 0, Book_4 = 1)}\right)}{\left(\frac{p(Book_1 = 1 \mid Book_3 = 0, Book_4 = 1)}{1 - p(Book_1 = 1 \mid Book_3 = 0, Book_4 = 1)}\right)}\right] \quad \text{Eqn. 7}$$

$$ES_{Book1-I}(Book_3, 0) = \log\left[\frac{\left(\frac{p(Book_1 = 1 \mid Book_2 = 0, Book_3 = 0, Book_4 = 1)}{1 - p(Book_1 = 1 \mid Book_2 = 0, Book_3 = 0, Book_4 = 1)}\right)}{\left(\frac{p(Book_1 = 1 \mid Book_2 = 0, Book_4 = 1)}{1 - p(Book_1 = 1 \mid Book_2 = 0, Book_4 = 1)}\right)}\right] \quad \text{Eqn. 8}$$

$$ES_{Book1-I}(Book_4, 1) = \log\left[\frac{\left(\frac{p(Book_1 = 1 \mid Book_2 = 0, Book_3 = 0, Book_4 = 1)}{1 - p(Book_1 = 1 \mid Book_2 = 0, Book_3 = 0, Book_4 = 1)}\right)}{\left(\frac{p(Book_1 = 1 \mid Book_2 = 0, Book_3 = 0)}{1 - p(Book_1 = 1 \mid Book_2 = 0, Book_3 = 0)}\right)}\right] \quad \text{Eqn. 9}$$

As described above, the denominator of each of these equations, Equation 7, 8, and 9, is estimated using one of a number of techniques. The particular book/value, ($Book_i$,, value i), having the highest Explanation Score is then said to have had the greatest influence in recommending $Book_1$ to the user. Clearly, this process can be repeated for determining the influence of each of the other books on a recommendation for any of the other books. In addition, it should be appreciated that in accordance with the system and process described herein, any number of objects may be recommended, with Explanation Scores being determined for each object as described above.

The foregoing description of the invention has been presented for the purposes of illustration and description. It is not intended to be exhaustive or to limit the invention to the precise form disclosed. Many modifications and variations are possible in light of the above teaching. It is intended that the scope of the invention be limited not by this detailed description, but rather by the claims appended hereto.

What is claimed is:

1. A computer-readable medium having computer executable instructions for determining an influence of at least one possible user choice on at least one prediction of likely user choices, said computer executable instructions comprising:
   predicting at least one likely user choice based on a probabilistic model and a set of preferences for the user;
   determining the influence of at least one of the possible user choices on the prediction of at least one likely user choice by calculating probabilistic explanation scores for each of at least one possible user choice, said explanation scores representing a probabilistic impact of predictor/variable value pairs on a posterior distribution corresponding to the prediction of each likely user choice;
   sorting the explanation scores; and
   providing one or more of the sorted explanation scores via a user interface.

2. The computer-readable medium of claim 1 wherein the set of user preferences is determined implicitly.

3. The computer-readable medium of claim 1 wherein the set of user preferences is determined explicitly.

4. The computer-readable medium of claim 1 wherein sorting the explanation scores comprises sorting each explanation score in order from highest to lowest.

5. The computer-readable medium of claim 4 wherein a predetermined number of highest value explanation scores from the sorted explanation scores are provided via a user interface.

6. The computer-readable medium of claim 1 wherein one or more highest value explanation scores from the sorted explanation scores are automatically provided as part a natural language explanation for explaining each prediction of likely user choices.

7. The computer-readable medium of claim 4 wherein a predetermined number of lowest value explanation scores from the sorted explanation scores are provided via a user interface.

8. The computer-readable medium of claim 4 wherein one or more of the sorted explanation scores are provided via a user interface as part a natural language explanation for explaining each prediction of likely user choices.

9. A system for automatically assigning scores to members of a set of at least one predictor/variable value pair representing likely user choices, comprising:
   obtaining a set of user preferences for a particular user;
   computing predictor/variable value pairs for each possible user choice using the set of user preferences in combination with a probabilistic model;
   computing at least one prediction of likely user choices based upon the predictor/variable value pairs;
   calculating explanation scores for at least one of the predictor/variable value pairs for each prediction;
   determining the influence of at least one member of the set of predictor/variable value pairs for each prediction based upon the scores calculated for the predictor/variable value pairs; and
   wherein at least one explanation score is provided via a user interface as part of natural language explanation for explaining why each prediction of likely user choices was made.

10. The system of claim 9 wherein the set of user preferences is obtained by examining a set of responses to a set of questions provided to the particular user.

11. The system of claim 9 wherein the set of user preferences is obtained by automatically examining at least one pattern of behavior of the particular user.

12. The system of claim 9 wherein the set of user preferences is obtained automatically by using a combination of implicit and explicit methods for determining the preferences of the particular user.

13. The system of claim 9 wherein the probabilistic model is automatically generated by examining a behavior of a group of at least one user.

14. The system of claim 9 wherein the probabilistic model is automatically generated using machine learning techniques.

15. A method for identifying positive and negative influences on recommendations of likely user choices, comprising:
   automatically computing predictor/variable value pairs for each possible user choice using a set of user preferences in combination with a probabilistic model;

automatically providing at least one recommendation of likely user choices based upon the predictor/variable value pairs;

automatically calculating an influence of each possible user choice for each recommendation based upon scores calculated for the predictor/variable value pairs, said scores representing a probabilistic impact of each possible user choice on a posterior distribution representing a probability of each recommendation; and wherein the influence of at least one possible user choice on the at least one recommendation of likely user choices is provided in a human readable format via a user interface.

16. The method of claim 15 wherein the set of user preferences is provided by user input via a user interface.

17. The method of claim 15 wherein the set of user preferences is provided by examining Internet web browsing behavior of a user.

18. The method of claim 15 wherein the probabilistic model is automatically learned using a set of behavioral data from a set of at least one user.

19. The method of claim 18 wherein the probabilistic model is automatically learned using machine learning techniques.

20. The method of claim 15 wherein providing the influence of at least one possible user choice in a human readable format comprises providing the influence as a natural language explanation via a user interface.

* * * * *